(12) United States Patent
Hoefler

(10) Patent No.: US 8,529,173 B2
(45) Date of Patent: Sep. 10, 2013

(54) METHOD TO ALIGN CHARACTERISTIC FREQUENCY OF MATERIAL REMOVAL TOOL AND ROTATION SPEED OF SPINDLE OF MACHINE TOOL AND MATERIAL REMOVAL TOOL SO ALIGNED

(75) Inventor: Brian D. Hoefler, Macomb, MI (US)

(73) Assignee: Valenite, LLC, Madison Heights, MI (US)

( * ) Notice: Subject to any disclaimer, the term of this patent is extended or adjusted under 35 U.S.C. 154(b) by 1212 days.

(21) Appl. No.: 12/354,933

(22) Filed: Jan. 16, 2009

(65) Prior Publication Data

US 2009/0187270 A1    Jul. 23, 2009

Related U.S. Application Data

(60) Provisional application No. 61/006,556, filed on Jan. 22, 2008.

(51) Int. Cl.
*B23B 29/02*    (2006.01)

(52) U.S. Cl.
USPC .................... 409/141; 409/234; 408/143

(58) Field of Classification Search
USPC .................... 407/32; 408/143; 409/141, 234
See application file for complete search history.

(56) References Cited

U.S. PATENT DOCUMENTS

| | | | |
|---|---|---|---|
| 2,133,867 A | 10/1938 | Lucas | |
| 3,464,098 A | 9/1969 | Moore et al. | |
| 3,559,512 A * | 2/1971 | Aggarwal | 408/143 |
| 3,690,414 A * | 9/1972 | Aggarwal et al. | 408/143 |
| 6,076,999 A | 6/2000 | Hedberg et al. | |
| 6,477,927 B1 | 11/2002 | Albo et al. | |
| 6,595,727 B2 | 7/2003 | Arvidsson | |
| 6,945,740 B2 | 9/2005 | Svenningsson et al. | |
| 7,938,599 B2 | 5/2011 | Takiguchi et al. | |
| 2003/0147707 A1 | 8/2003 | Perkowski | |
| 2005/0214087 A1 | 9/2005 | Agapiou et al. | |
| 2006/0275090 A1 | 12/2006 | Onozuka et al. | |
| 2008/0226401 A1 | 9/2008 | Hoefler et al. | |
| 2011/0103903 A1 | 5/2011 | Sture | |
| 2011/0182679 A1 | 7/2011 | Bierl et al. | |
| 2011/0229278 A1 | 9/2011 | Sjöö | |
| 2013/0004250 A1 | 1/2013 | Gamble | |

FOREIGN PATENT DOCUMENTS

| | | | |
|---|---|---|---|
| JP | 2005329509 A | * | 12/2005 |
| JP | 2009-226548 A | | 10/2009 |
| JP | 2009-233800 A | | 10/2009 |
| WO | WO 02/45892 A1 | | 6/2002 |
| WO | WO 2008/002145 | | 1/2008 |

OTHER PUBLICATIONS

Machine Translation of Muroya.*

(Continued)

*Primary Examiner* — Dana Ross
*Assistant Examiner* — Pradeep C Battula
(74) *Attorney, Agent, or Firm* — Morgan, Lewis & Bockius LLP

(57) ABSTRACT

A method to adjust a modal property of a material removal tool without changing a projection length of the material removal tool is disclosed. Adjusting substantially aligns a characteristic frequency of the material removal tool with a rotation speed of a spindle of a machine tool. A material removal tool employing the method and a method to machine metal are also disclosed.

13 Claims, 5 Drawing Sheets

(56) References Cited

OTHER PUBLICATIONS

"Metalmax," [Online] Manufacturing Laboratories, Inc., 2001 [retrieved on Jan. 21, 2009]. Retrieved from the Internet: <www.mfg-labs.com>.

P. Zelinski, "Find the Right Speed for Chatter-Free Milling", [Online] *Modern Machine Shop*, [retrieved on Oct. 25, 2007], pp. 1-2, Retrieved from the Internet: <http://www.mmsoline.com/articles/article_print1.cfm>.

P. Zelinski, "The Overhang Effect", [Online] *Modern Machine Shop*, pp. 1-5, Retrieved from the Internet: <www.mmsonline.com>, Copyright 1997-2007.

P. Zelinski, "Maximum Aluminum", [Online] *Modern Machine Shop*, pp. 1-6, Retrieved from the Internet: <www.mmsonline.com>, Copyright 1997-2007.

P. Zelinski, "High Speed Machining: Aerospace Boeing's One Part Harmony", [Online] *Modern Machine Shop*, pp. 1-8, Retrieved from the Internet: <www.mmsonline.com>, Copyright 1997-2007.

E. Leigh et al., "Applying High-Speed Machining Techniques on rotor Grip Configurations", *AHS International*, Presented at the American Helicopter Society 55th Annual Forum, May 25-27, 1999, Montreal, Canada, pp. 1-16.

E. Leigh et al., "Advanced Machining Techniques on Titanium Roter Parts", *AHS International*, Presented at the American Helicopter Society 55th Annual Forum, May 2-4, 2000, Virginia Beach, VA, pp. 1-19.

P. Darcy, "Productivity Improvements Through Collaboration", Presented at the American Helicopter Society 58th Annual Forum, Jun. 11-13, 2002, Montreal, Canada, pp. 1-12.

Hoefler; "Time Domain Simulations of Metal-Cutting Systems with Experimental Verification," Thesis submitted to the Department of Mechanical Engineering at Northern Illinois University, Dec. 1997.

Smith, et al.; "An Overview of Modeling and Simulation of the Milling Process," *Journal of Engineering for Industry*, vol. 113, May 1991, pp. 169-175.

Tlusty, "Dynamics of High-Speed Milling," *Journal of Engineering for Industry*, vol. 108, May 1986, pp. 59-67.

Smith, "The science of milling sounds," *Cutting Tool Engineering*, vol. 65, Issue 2, Feb. 2013, pp. 20-21.

Smith, "Reasons for stable milling zones," *Cutting Tool Engineering*, vol. 64, Issue 10, Oct. 2012, pp. 24-25.

\* cited by examiner

METHOD TO ALIGN CHARACTERISTIC FREQUENCY OF MATERIAL REMOVAL TOOL AND ROTATION SPEED OF SPINDLE OF MACHINE TOOL AND MATERIAL REMOVAL TOOL SO ALIGNED

RELATED APPLICATION DATA

This application claims priority under 35 U.S.C. §119(e) to U.S. Provisional Application No. 61/006,556, filed Jan. 22, 2008, the entire contents of which are incorporated herein by reference.

FIELD

The present disclosure relates to a material removal tool and machining with the material removal tool. In particular, the present disclosure relates to a method of substantially aligning the material removal tool's characteristic frequency with a desired, typically maximum, operating speed of the associated machine tool spindle on which the material removal tool is mounted. Aligning the material removal tool's characteristic frequency with the spindle's operating speed occurs by altering modal properties of the material removal tool.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

The removal of material during metal cutting is by the formation of "chips". Chatter in metal cutting is generally understood to be the result of regenerative waviness or a varying of actual chip thickness within each chip produced. The self excited form of vibration associated with chatter gains energy from the system due to varying chip thickness. It's unstable and uncontrolled growth can result in significant damage to tools, machines and workpieces. Furthermore, avoiding chatter negatively impacts spindle speeds, depth of cut or both, all of which negatively impact machining efficiencies.

Chatter can be diminished at low RPMs due to "process dampening" that occurs due to the contact of the workpiece behind the cutting edge. Since many metal cutting systems are under damped, this source of energy absorption contributes to stable cutting. A generally accepted schematic of this phenomena is illustrated in FIG. 1, where the change in clearance angle between the insert and the workpiece is depicted. However, under process dampening reduces the efficiency of the metal cutting operation because of contact with the workpiece by non-cutting surfaces of the insert, i.e., rubbing.

The phase relationship in regenerated waviness is depicted in the schematic in FIGS. 2A and 2B for in-phase (FIG. 2A) and out-of-phase (FIG. 2B) conditions. There can be many orders of magnitude in quantity of waves in a single chip generated. Acoustically, this is the noise heard in chatter and is often in the painful hearing range of humans. When the phase relationship is substantially zero (FIG. 2A) stable cutting is experienced and the energy source is essentially zero. When the phase relationship is 180 degrees (FIG. 2B) large cutting force variation and noise are present.

Every combination of spindle on a machine tool, tool holder and material removal tool (a material removal tool system) has unique and inherently stable characteristic frequencies. FIG. 3 illustrates conceptually the concept of stable characteristic frequencies. In FIG. 3, axial depth of cut is plotted as a function of spindle speed. The trace 10 represents the chatter—no chatter transition. Below a certain critical depth of cut ($D_{cr}$), all operating spindle speeds result in no chatter. Similarly, as spindle speed becomes low, substantially all depth's of cut result in no chatter. However, at various operating speeds of the spindle, the material removal tool can operate at varying hypothetical depths of cut without inducing chatter, for example, regions 12, 14, 16, 18 and 20, which represent pockets of stability for the material removal tool. The pockets of stability have an integer multiple relationship with respect to the spindle speed. Operating in these pockets of stability would allow operating at a fast stable speed to achieve a high rate of material removal.

Attempts to limit the negative impact on machining efficiencies have been attempted. In one approach, the operating speed of the spindle of the machine tool is empirically selected to be coincident with one of the pockets of stability discussed above and shown in FIG. 3. However, the pockets of stability of a material removal tool may not also be at or even near the maximum operating speed of the spindle, so overall efficiency of cutting is still not maximized. In another approach, preventing chatter at high operating speeds has been attempted by altering the size of the material removal tool. For example, it has been suggested to change the tool overhang length, e.g., the length the tool extends from the holder, to effect the characteristic frequency. However, when operating on a preprogrammed tool path even a slight difference in length from tool to tool can negatively impact machining accuracies and manufacturing efficiencies.

SUMMARY

It would be advantageous to develop a material removal tool that was tunable to operate with high rotation speeds, for example, at speeds approaching the maximum rotation speed, and large depths of cut without experiencing chatter under operating conditions and without changing the length of the material removal tool. This is particularly so for material removal tools using preprogrammed tool paths because preventing chatter without changing tool dimensions can avoid having to reprogram the tool path. This problem is solved by, for example, adjusting the modal properties of the material removal tool without changing the length of the material removal tool so that a characteristic frequency, preferably a dominant frequency, is aligned with a maximum operating speed of the spindle. This aligns the tooth passing frequency with the characteristic frequency, preferably the dominant frequency, i.e., the phase difference becomes substantially zero. The tooth passing frequency is proportional to the speed of the spindle in rpm times the number of teeth or cutting inserts on the material removal tool.

An exemplary embodiment of a method comprises adjusting a modal property of a material removal tool without changing a projection length of the material removal tool.

An exemplary method to tune a material removal tool comprises determining a frequency range of one or more characteristic frequencies, determining a maximum rotation speed of a spindle of a machine tool, and changing the frequency range of one of the characteristic frequencies to substantially coincide with the maximum rotation speed of the spindle by changing one or more of (a) dimension or (b) the Young's modulus of a spacer arranged along a projection length of the material removal tool, wherein the projection length of the tool after changing the frequency range is the same as the projection length of the tool before changing the frequency range.

An exemplary material removal tool comprises a housing at a mating end, an extension longitudinally extending from the housing to a distal end, and a plurality of exchangeable spacers arranged along the extension, wherein one or more of a physical property and a material property of at least one of the plurality of exchangeable spacers changes a frequency range of a characteristic frequency of maximum stability of the material removal tool, and wherein a projection length of the tool after changing the frequency range is the same as the projection length of the tool before changing the frequency range.

An exemplary embodiment of a combination for machining metal comprises a machine tool including a rotatable spindle, the machine tool having a maximum rotation speed and a material removal tool mounted on the rotatable spindle, the material removal tool including an extension longitudinally extending from a housing at a mounting end of the tool to a distal end and a plurality of spacers arranged along the extension, wherein one or more of a physical property and a material property of at least one of the plurality of spacers changes a frequency range of a characteristic frequency of the material removal tool to be within 30% of a maximum rotation speed of the spindle of the machine tool, and wherein a projection length of the tool after changing the frequency range is the same as the projection length of the tool before changing the frequency range.

An exemplary embodiment of a method to remove material from a workpiece comprises determining a frequency range of one or more characteristic frequencies of a material removal tool, determining a maximum rotation speed of a spindle of a machine tool, changing the frequency range of one of the characteristic frequencies to substantially coincide with the maximum rotation speed of the spindle by changing one or more of (a) a thickness or (b) the Young's modulus of a spacer arranged along a projection length of the material removal tool, wherein the projection length of the tool after changing the frequency range is the same as the projection length of the tool before changing the frequency range, rotating the aligned material removal tool at the rotation speed, and contacting the material removal tool to the workpiece to remove material to a depth of cut.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

The present application discloses methods to align a characteristic frequency of a material removal tool and a rotation speed of a spindle of a machine tool. In an exemplary embodiment, the characteristic frequency is a dominant frequency. Such methods can prevent chatter while maximizing depth of cut and cutting speed.

An exemplary embodiment of such a method comprises adjusting a modal property of a material removal tool without changing a projection length of the material removal tool. Adjusting the modal property substantially aligns a characteristic frequency of the material removal tool system with a tooth passing frequency. When the number of teeth or cutting inserts on the material removal tool are known, one can align the characteristic frequency with the rotation speed of a spindle of a machine tool. For example, generally the characteristic frequency of the material removal tool is at or near (within ±10%) that tooth passing frequency at which the material removal tool exhibits the greatest depth of cut (also called the dominant frequency) and the rotation speed of the spindle of the machine tool is at or near (within ±30%) the maximum rotation speed of the spindle. Alternatively, the characteristic frequency can be that tooth passing frequency at which the material removal tool exhibits a depth of cut that is lower than the greatest depth of cut but that is nearest rotation speeds maximally achievable by the spindle or can be that characteristic frequency that is changeable to be near the maximum rotation speeds achievable by the spindle.

The characteristic frequency can, in exemplary embodiments, be the dominant frequency or near (within ±10%) that dominant frequency. Alternatively, the characteristic frequency can, in exemplary embodiments, be within a range defined by the full width at half maximum (FWHM) centered on the dominant frequency. Substantial alignment by the disclosed process results in the characteristic frequency being within 30% of a maximum rotation speed of the spindle, alternatively being within 10% of the maximum rotation speed of the spindle. Integer multiples of the characteristic frequency can also be used as the basis for aligning the material removal tool system.

In one example, the rotation speed of the spindle can be in a range of 0.7 to 1.0 times a maximum rotation speed of the spindle. In another example, rotation speeds between about 15,000 rpm and about 20,000 rpm can be used, alternatively, rotation speeds at or above about 20,000 rpm can be used. In general, the maximum rotation speed depends on the operating envelop of the machine tool.

Figure 1:
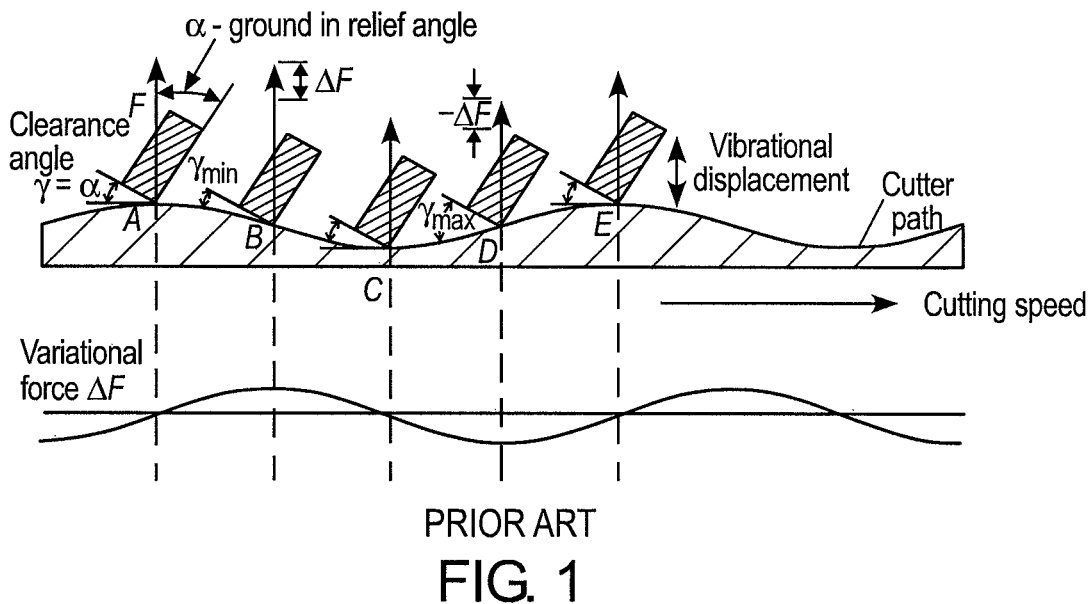
FIG. 1 is a schematic representation of process dampening that occurs due to the contact of the workpiece behind the cutting edge.
Figure 2A:
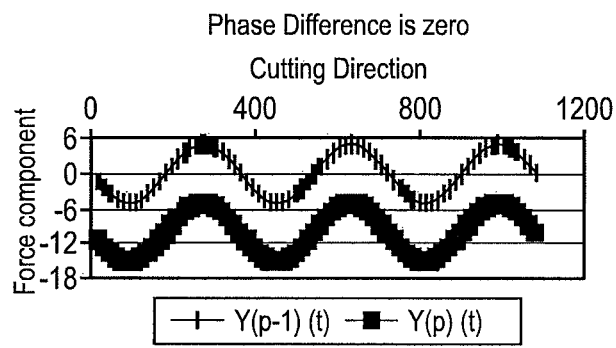
FIGS. 2A and 2B are a schematic representation of the phase relationship in regenerated waviness for in-phase (FIG. 2A) and out-of-phase (FIG. 2B) conditions.
Figure 2B:
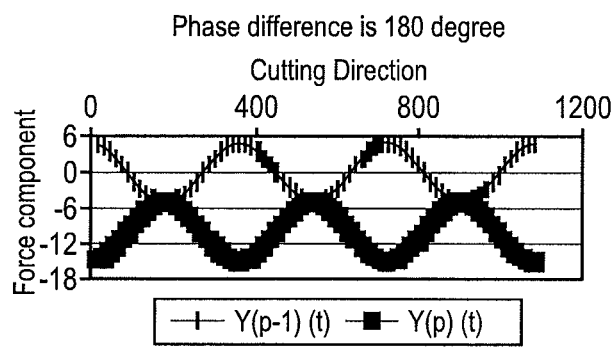
Figure 3:
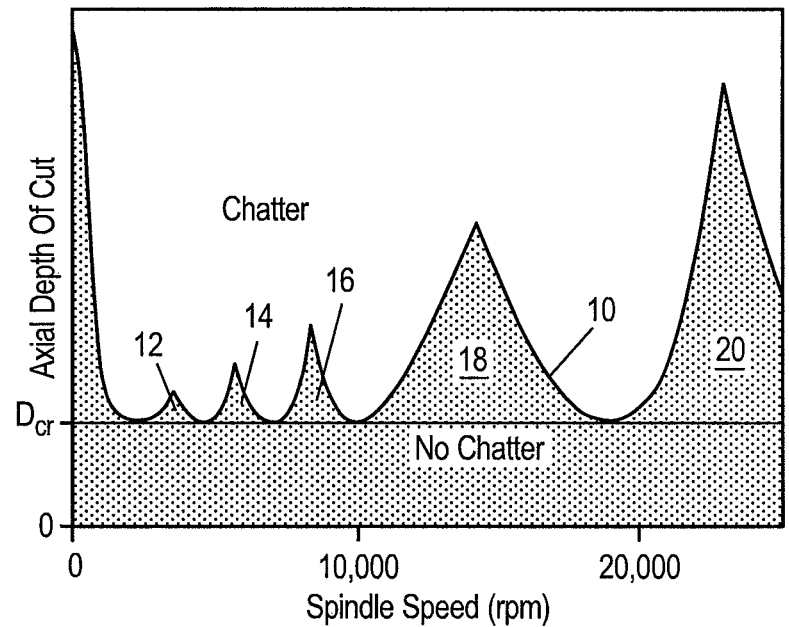
FIG. 3 is a graphical representation of the relationship between rotation speed of the spindle and the axial depth of cut illustrating the concept of pockets of stability.
Figure 4:
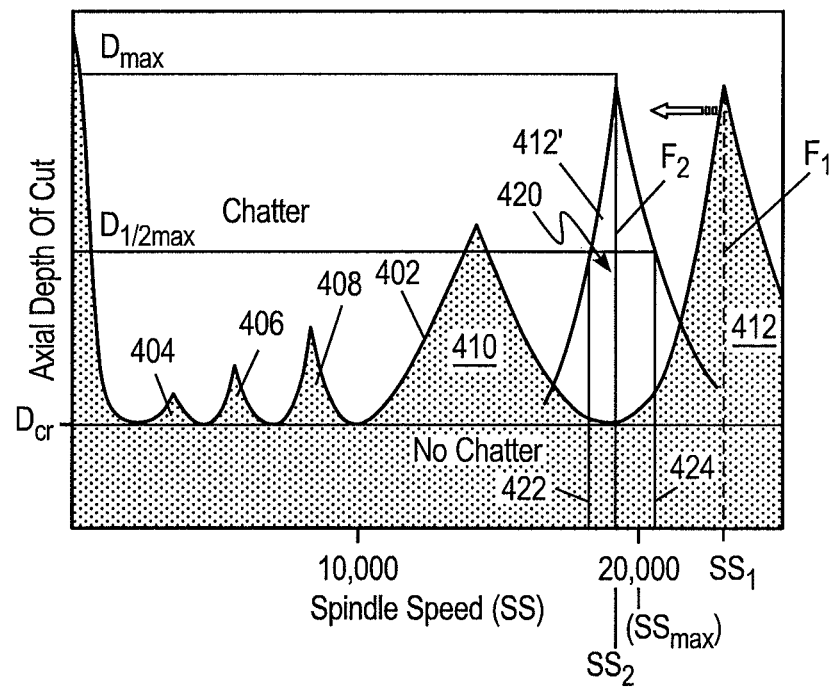
FIG. 4 is a graphical representation of the relationship between rotation speed of the spindle and the axial depth of cut showing the boundary between chatter and no chatter in the system and the alignment of a characteristic frequency of the material removal tool and the rotation speed of the spindle of the machine tool using exemplary embodiments disclosed herein.

FIG. 4 is a graphical representation of the relationship between rotation speed of the spindle and the axial depth of cut. In FIG. 4, the boundary 402 between chatter and no chatter in the system is shown. Several areas 404, 406, 408, 410, 412 of increased depth of cut exhibit increasing depth of cut (D) with increasing spindle speed (SS). By way of example, consider area 412, which has the greatest depth of cut for the depicted boundary 402. Area 412 contains the dominant frequency for the depicted system. A maximum depth of cut ($D_{max}$) occurs at a first characteristic frequency ($F_1$) having a first spindle speed ($SS_1$), which is at a spindle speed greater than the maximum rotation speed of the spindle ($SS_{max}$), depicted for illustration purposes as about 20,000 rpm.

For a particular tool and boundary, there is a modal property that is a function of the stiffness of the tool and the effective mass of the tool. The relationship can generally be represented by:

$$\text{modal property} \propto \frac{\sqrt{\text{stiffness}}}{\text{mass}}.$$

With the methods disclosed herein, the modal properties of the material removal tool can been changed to shift the original area 412 and first characteristic frequency ($F_1$) at a first spindle speed ($SS_1$) to second area 412' and second characteristic frequency ($F_2$) at a second spindle speed ($SS_2$). In addition, each area 404, 406, 408, 410, 412 of increased depth of cut has an associated full width at half maximum (FWHM) about the characteristic frequency that allows substantially the greatest depth of cut for each area. For the second area 412', FIG. 4 illustrates the FWHM 420 that has a range of frequencies that vary about the second characteristic frequency ($F_2$). The range of frequencies for FWHM 420 has a lower bound 422 and an upper bound 424.

Typically, the range of frequencies for any FWHM is centered on the characteristic frequency that allows the greatest depth of cut for that area, but that is not necessary in each instance. For example and as shown in FIG. 4 for second area 412', the FWHM can be nonsymmetrical about the characteristic frequency that allows the greatest depth of cut for that area. The degree of symmetry of the FWHM is dependent on the form of the boundary of the area.

In exemplary embodiments, the spindle speed of the second characteristic frequency ($F_2$), i.e., the second spindle speed ($SS_2$), will be substantially aligned with the maximum rotation speed of the spindle ($SS_{max}$), i.e., within ±30%, alternatively within ±10%, of the maximum spindle speed ($SS_{max}$). In other exemplary embodiments and as shown in FIG. 4, the maximum rotation speed of the spindle ($SS_{max}$) will be within the range of frequencies of the FWHM 420, i.e., at or above a lower bound spindle speed 422 and at or below an upper bound spindle speed 424.

Figure 5:
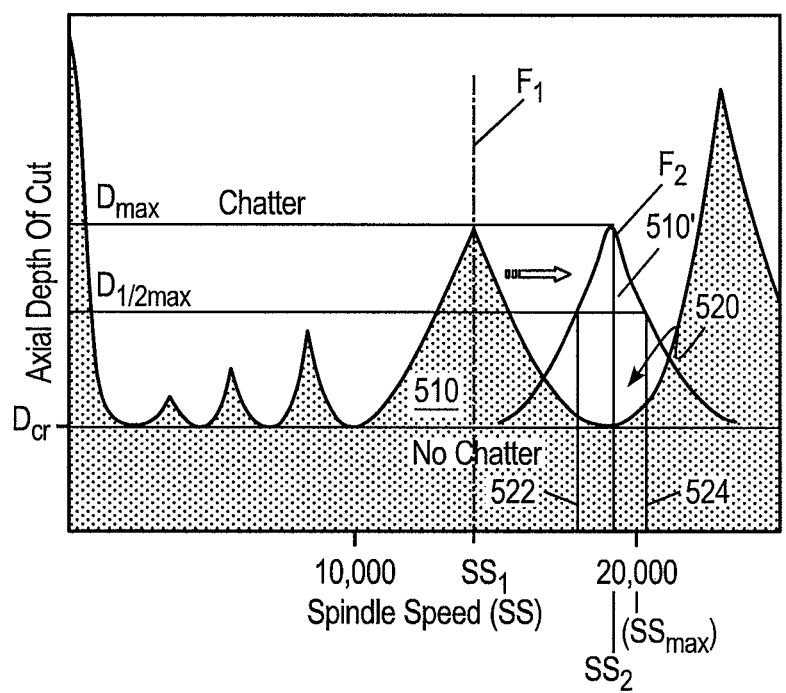
FIG. 5 is another graphical representation of the relationship between rotation speed of the spindle and the axial depth of cut showing the boundary between chatter and no chatter in the system and the alignment of a characteristic frequency of the material removal tool and the rotation speed of the spindle of the machine tool using exemplary embodiments disclosed herein.

Although illustrated in FIG. 4 as a higher original area 412 and first characteristic frequency ($F_1$) at a first spindle speed ($SS_1$) being shifted lower to a second area 412' and second characteristic frequency ($F_2$) at a second spindle speed ($SS_2$), the principles and methods disclosed herein can also be used to shift a lower original area and characteristic frequency at a first spindle speed higher to a second area and second characteristic frequency at a second spindle speed. For example and as shown in FIG. 5, original area 510 could be shifted in this manner to area 510' at a higher spindle speed, such as toward the maximum spindle speed ($SS_{max}$). A FWHM 520 with a lower boundary 522 and an upper boundary 524 can also be identified similar to that illustrated in FIG. 4. Further, it may be more efficient or desirable to select a lower original area for shifting. For example, the amount of shifting for a higher original area may be too great and require too much adjustment of the modal properties to result in alignment of the characteristic frequency of the material removal tool with a rotation speed of a spindle of a machine tool as compared to shifting a lower original area for shifting.

Examples of modal properties include one or more of a modal mass, a modal stiffness property, a dampening property and a characteristic frequency. Modal mass and stiffness can be described as component values in a matrix based upon how many modes of vibration exist and the number of directions that exist in a coordinate system. Most cutting tool vibrations normally have an X and Y direction for each vibration mode. Adding together all of the individual mass components yields the total mass of the system; likewise for the stiffness components. In most cutting tool systems, there are two to three components of mass and stiffness that are limiting criteria within the system. The components of mass and stiffness associated with these limits are generally referred to as modal mass and modal stiffness although mathematically they are the component values associated with these limits. The limiting values, or modal properties are readily determined with well established techniques in vibration measurement. The limiting values of modal mass and modal stiffness are best described as those components which are most readily excited by vibration input. Through the techniques and apparatus disclosed herein, these values can be adjusted such that associated natural frequencies of these dominant or limiting values are aligned with the tooth passing frequency at or near the limits of the operation of the machine tool capabilities, i.e., maximum spindle speed.

Figure 6:
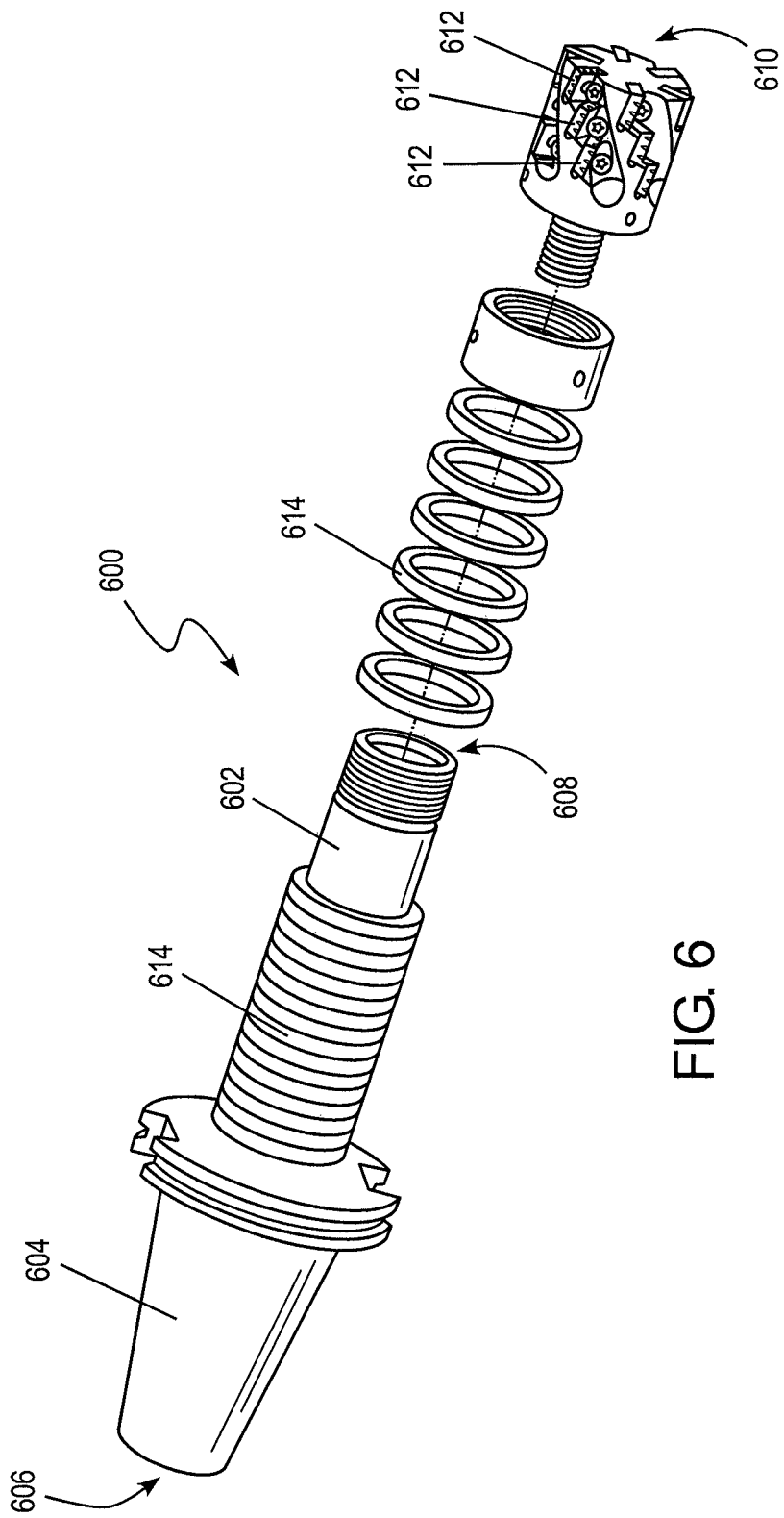
FIG. 6 schematically illustrates an exemplary embodiment of a material removal tool that can be subject to the methods and principles disclosed herein.

FIG. 6 schematically illustrates an exemplary embodiment of a material removal tool that can be subject to the methods and principles disclosed herein. The illustrated material removal tool 600 includes an extension 602 longitudinally extending from a housing 604 at a mating end 606 to a distal end 608. A cap 610 is mounted to the distal end 608 of the extension 602 and includes a plurality of cutting inserts 612. Arranged along at least a portion of the length of the extension 602 is a plurality of spacers 614. The housing 604 at the mating end 606 of the material removal tool 600 attaches to a machine tool, such as a HAAS VF6 milling machine, during operation. The housing can take any suitable form that allows attachment to the spindle of a desired machine tool.

Figure 7:
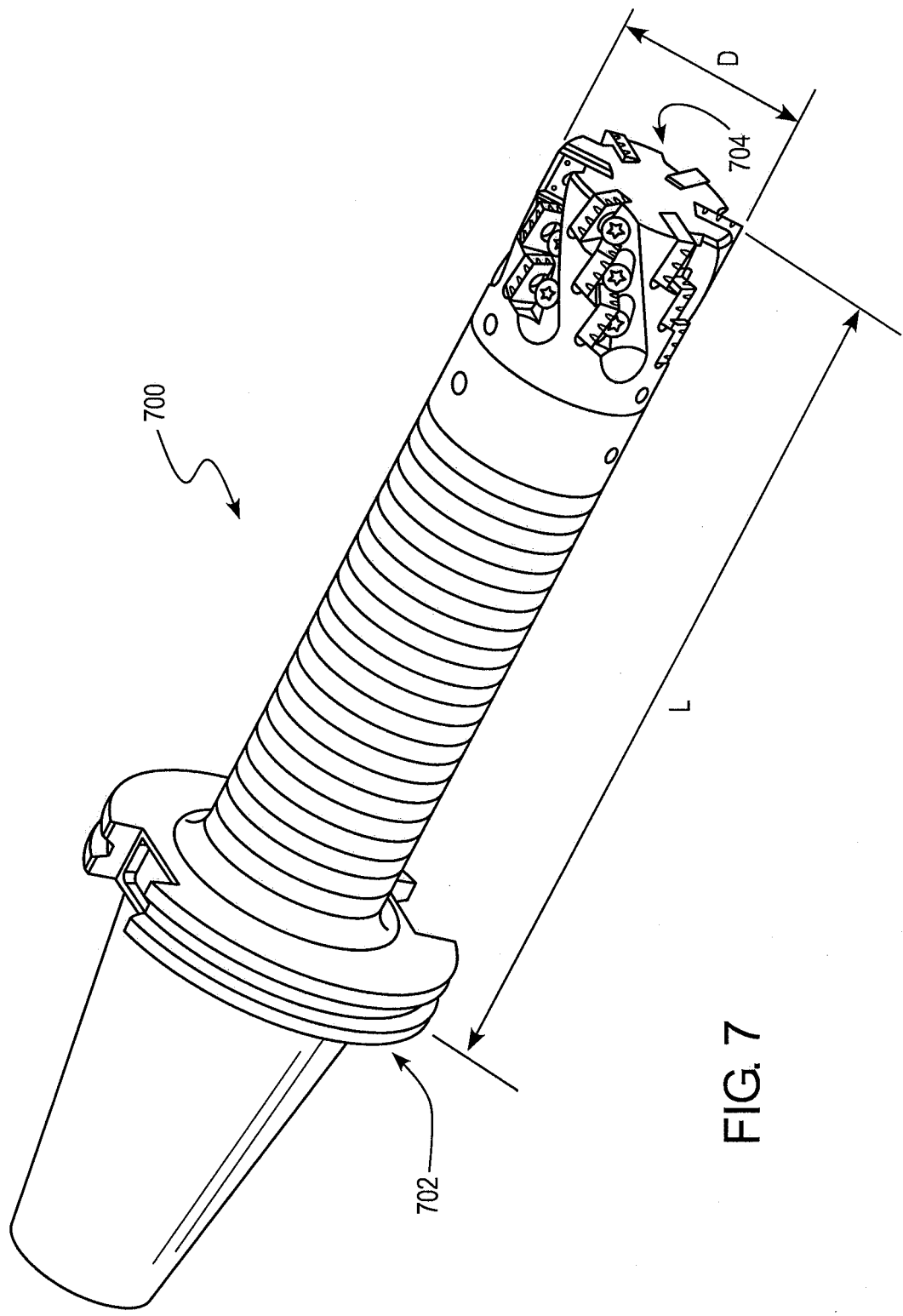
FIG. 7 shows the assembled view of the exemplary embodiment of the material removal tool of FIG. 6.

The number of spacers along the extension varies based on the length of the material removal tool. As shown in the assembled view of FIG. 7, the material removal tool 700 has projection length L, which is from the gage line 702 to the cutting end 704, and has a diameter D. The gage line 702 is the maximum diameter of the mating end that contacts the machine tool when in operation. In exemplary embodiments, a ratio of the projection length to the diameter (L:D) is about 2:1 to about 18:1. Standard lengths are about 2:1, about 3:1, about 4:1, about 5:1, about 6:1, about 7:1, about 8:1 and about 12:1. However, any projection length and diameter can be used in that performance is improved using the disclosed spacers. As the length of the extension varies between material removal tools, the number of the spacers arranged along the extension varies.

The spacers can take any physical form. One exemplary embodiment of a suitable physical form is the shape of a washer. In an additional exemplary embodiment, the spacer is a washer having an outer diameter surface and an inner diameter surface and the radius of the outer diameter surface ranges from about 1.33 to about 2 times the radius of the inner diameter surface.

A suitable material removal tool is disclosed in U.S. patent application Ser. No. 11/730,690, filed Apr. 3, 2007, the entire contents of which are incorporated herein by reference.

In exemplary methods, adjusting includes changing one or more of a radial size of a spacer, a thickness of a spacer or a material property, such as Young's modulus, of a spacer. The spacers are formed from a material having a Young's modulus of about that of steel, i.e, about $30\times10^6$ lbf/in$^2$. Also for example, the spacers along any one extension can have dissimilar Young's modulus, with some spacers having a Young's modulus of about that of steel and other spacers having a Young's modulus that is less than steel and still others having a Young's modulus that is greater than steel and combinations of such spacers. Such spacers can be formed from stiff materials, for example, cemented carbide (WC), heavy metal (a steel-WC composite) or binderless carbide.

The material removal tool has, for example, one or more spacers arranged along a length of the tool. The spacers can be arranged in a predetermined or adjustable fashion to alter the modal properties, for example, modal mass, modal stiffness properties, dampening properties and natural frequencies, of the material removal tool. By mixing, substituting or otherwise changing or interchanging the spacers, which have varying moduli because of the different sizes, thicknesses or material properties, one can change an effective Young's modulus of the tool. By changing the effective Young's modulus of the tool, one can manipulate the modal properties of the material removal tool to thereby shift the characteristic frequency of the material removal tool and to align that frequency with a rotation speed of the spindle, e.g., the maximum rotation speed. Similarly, changing the spacers can change the contribution from that spacer to the effective Young's modulus of the tool and produce the attendant effects noted above. Mixing, substituting or otherwise changing or interchanging the spacers can occur, for example, by removal of the cap 510 and other elements from the tool 500 and removal, reordering and/or replacement of the spacer(s) 518.

Tuning of metal cutting tools includes measuring and targeting pockets of stable cutting. The pockets of stable cutting are not necessarily at the maximum spindle speed of a given machine. Shifting of pockets of stable cutting to the areas of maximum spindle speed of a given machine offers substantial opportunities for increased productivity. Given that increases in tool lengths is not always possible to shift stable zones, decreasing the modal stiffness is worth some gains where appropriate. It should be noted that increasing tool lengths also decreases part accuracy. In other cases, increasing stiffness is the right approach. Additional dampening sources generally never hurts in these systems and may optionally be included. The disclosed system offers the ability to alter the modal properties by the use of materials in ring form. The performance of the system could be adjusted such that it generates the largest pockets of stable cutting at the maximum output of the machine capabilities. It is simple, relatively low cost and easy to repair.

A pocket of stability can be shifted from a higher frequency to a lower frequency or from a lower frequency to a higher frequency by suitable changes in the modal properties. For example and as shown in FIG. 4, a pocket of stability 412 can be shifted lower to area 412' by decreasing the stiffness of the tool, such as by exchanging one or more washers along the length of the tool for one or more washers with a lower stiffness. Alternatively, the pocket of stability 412 can be shifted lower to area 412' by increasing the mass of the tool, such as by exchanging one or more washers along the length of the tool for one or more washers with a higher mass. In another example and as shown in FIG. 5, a pocket of stability 410 can be shifted higher to area 410' by increasing the stiffness of the tool, such as by exchanging one or more washers along the length of the tool for one or more washers with a higher stiffness. Alternatively, the pocket of stability 410 can be shifted higher to area 410' by decreasing the mass of the tool, such as by exchanging one or more washers along the length of the tool for one or more washers with a lower mass.

Modal properties can be measured with a tap test. A general tap test incorporates an instrumented hammer and accelerometer and/or a microphone that connects to a PC and vibration analysis software. Vibration analysis software is available from Manufacturing Laboratories, Inc. of Gainesville, Fla. By knowing the modal mass and stiffness, the natural frequencies can be determined. For example, through simulation a stability lobe diagram can be generated as seen in FIG. 4. There are also commercially available software and measuring devices that can be used to prepare this picture of the system. Examples of such a systems are a tap test or a commercial system, such as Metalmax™ available from Manufacturing Laboratories, Inc. of Gainesville, Fla.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
a housing at a mating end;
an extension longitudinally extending from the housing to a distal end; and
a plurality of exchangeable spacers arranged along the extension,
wherein a modal stiffness and a modal mass of the material removal tool is changeable by changing one or more of a physical property and a material property of at least one of the plurality of exchangeable spacers,
wherein the changed modal stiffness and modal mass shifts a frequency range of a characteristic frequency of maximum stability of the material removal tool, and
wherein a projection length of the tool after changing the frequency range is the same as the projection length of the tool before changing the frequency range.

2. The tool of claim 1, wherein the physical property includes one or more of a radial and an axial dimension of the spacer.

3. The tool of claim 1, wherein the material property includes the Young's modulus of the spacer.

4. The tool of claim 1, comprising a nut at the distal end of the extension, wherein the nut places a compressive preload on the plurality of spacers and wherein the nut is removable to allow addition, removal or exchange of the spacers.

5. The tool of claim 1, wherein along the length of the extension, the plurality of exchangeable spacers are nonuniform with respect to at least one of a physical property and a material property.

6. A combination for machining metal, comprising:
a machine tool including a rotatable spindle, the machine tool having a maximum rotation speed; and
a material removal tool mounted on the rotatable spindle, the material removal tool including an extension longitudinally extending from a housing at a mounting end of the tool to a distal end and a plurality of spacers arranged along the extension,
wherein a modal stiffness and a modal mass of the material removal tool is changeable by changing one or more of a physical property and a material property of at least one of the plurality of spacers, wherein the changed modal stiffness and modal mass shifts the a frequency range of a characteristic frequency of the material removal tool to be within 30% of a maximum rotation speed of the spindle of the machine tool, and wherein a projection length of the tool after changing the frequency range is the same as the projection length of the tool before changing the frequency range.

7. The combination of claim 6, wherein the characteristic frequency changed to be within 30% of the maximum rotation speed is within ±10% of the characteristic frequency of maximum depth of cut for the material removal tool.

8. The combination of claim 7, wherein the characteristic frequency that allows the greatest depth of cut is the dominant frequency.

9. The combination of claim 6, wherein the characteristic frequency changed to be within 30% of the maximum rotation speed is a frequency that is within a full width at half maximum (FWHM) centered on the characteristic frequency that allows the greatest depth of cut.

10. The combination of claim 9, wherein the characteristic frequency that allows the greatest depth of cut is the dominant frequency.

11. The combination of claim 6, wherein the physical property includes a thickness of the spacer.

12. The combination of claim 6, wherein the material property includes the Young's modulus of the spacer.

13. The combination of claim 6, comprising a nut at the distal end of the extension, wherein the nut places a compressive preload on the plurality of spacers and wherein the nut is removable to allow addition, removal or exchange of the spacers.

* * * * *